Patented Jan. 9, 1951

2,537,272

UNITED STATES PATENT OFFICE 2,537,272

METHOD OF REGENERATING A MOVING CATALYST

Louis S. Kassel, Chicago, Ill., assignor to Universal Oil Products Company, Chicago, Ill., a corporation of Delaware No Drawing. Application April 22, 1940, Serial No. 330,951

7 Claims. (Cl. 252—418)

This invention relates to an improved method of reactivating spent powdered catalysts upon which carbonaceous materials have deposited during a prior hydrocarbon conversion treatment by burning such carbonaceous material in such a manner that the activity is not impaired. More specifically, the invention is concerned with a method of reactivating powdered catalysts so that their activity is not impaired by overheating at relatively high temperatures.

The more common method of reactivating catalysts such as those formed by extrusion or by pelleting and granular catalyst particles upon which carbonaceous materials have deposited involves passing a stream of heated reactivating gases containing controlled amounts of oxygen in contact with said catalyst, the catalyst being confined within a reaction zone which is alternately employed in processing and reactivation. To avoid damaging the catalyst by overheating while combustion of the carbonaceous materials is being effected, it is general practice to circulate large amounts of reactivating gases containing the oxygen in order to remove the heat generated as sensible heat in the reactivating gases.

In catalytic processes employing alternately operated reaction zones, common headers are used through which the hydrocarbon reactants flow during the processing cycle and reactivating gases during the reactivation cycle and suitable switching valves are also utilized to prevent commingling of the two streams. It is desirable, therefore, to maintain the hydrocarbon reactants and the reactivating gas streams at substantially the same pressure or preferably maintain the reactivating gas stream at a slightly higher pressure than the stream of reactants so as to minimize the losses due to leakage, and if any leakage does occur between the two streams it is preferred that it be from reactivating gases to reactants rather than the reverse. It is obvious, therefore, that the amount of reactivating gases which may be supplied to the reaction zone will be determined by the allowable pressure which naturally increases when the amount of gases is increased, due to the increased pressure drop.

Ordinarily, oxygen concentrations of from 2 to 3% or higher are employed, however, in reactivations where the burning is so vigorous that high reactivating temperatures, usually above 1600° F., are reached, lower oxygen concentrations may be employed, such as, for example, 1% or less. With the lower oxygen concentrations, however, longer reactivation times are required thereby decreasing useful conversion times. In the case of extruded, pelleted, or granular catalyst particles upon which carbonaceous materials have deposited during a prior processing cycle, it is possible that the proportion of carbonaceous material to catalyst present during reactivation may be relatively small, whereas in the case of a powdered catalyst which is ordinarily employed by injecting said catalyst into the flowing stream of hydrocarbon reactants to be converted it may contain a higher proportion of carbonaceous material to catalyst making it relatively harder to reactivate by common methods and still avoid overheating.

When subjecting powdered catalyst to reactivation in the preesnce of an oxygen-containing reactivating gas, due to the relatively low heat capacity of the catalytic material and the relatively small amount present, extremely high temperatures may be reached damaging such catalytic material by overheating. To avoid overheating the catalytic material, large volumes of reactivating gases may be circulated through the zone in which such material is undergoing reactivation, whereby heat is removed as sensible heat in the reactivating gases or relatively low oxygen concentrations may be employed whereby to retard combustion and thus prevent overheating.

Both of the methods above mentioned were discussed previously in connection with reactivation of pelleted catalysts, however, the methods whether employed in reactivation of powdered catalysts or catalyst particles will necessitate the use of large compressors when recirculating large volumes of reactivating gases or when relatively low oxygen concentrations are employed long reactivation times are necessary whereby both methods would become exceedingly expensive, in the first case due to the increased power consumption and in the latter case due to the decrease in useful conversion time. The two methods for reactivating powdered catalyst by burning the carbonaceous materials, as above described, are not particularly desirable for reasons above mentioned, and, in addition, because of the fact that powdered catalyst is ordinarily removed from the conversion zone and should not be subject to the limitations encountered when reactivating spent catalytic material used in stationary beds.

In view of the above, my invention provides for recycling a portion of the cooled reactivated catalytic material to the reactivation zone and thereby increase the amount of heat absorptive material present without also increasing the amount of carbonaceous material present whereby the ratio of carbonaceous material to catalytic material or heat absorptive material is lowered proportionately. When employing this method of reactivation, it is possible to reduce the reactivating gas requirements while maintaining the quantity of oxygen at the same or at a higher figure. A large proportion of the heat generated therefor is used in heating the cooled reactivated catalytic material to the temperature of the reactivation zone by continuously withdrawing the freshly reactivated catalyst and introducing a cooler portion thereof.

The invention is applicable to methods of reactivation wherein reactivation is accomplished in a batch or continuous process. The reactivation process may be one, for example, which employs a rotary kiln which may be direct or muffled fired and which preferably is well insulated to reduce radiation losses therefrom, so that after reactivation is once started, the radiation losses will not be excessive and cause the zone to cool to a temperature below that at which reactivation is preferably carried out.

The invention may be employed, for example, in the reactivation of spent powdered cracking catalyst of the silica-alumina type. To reactivate this material, a continuous feed rotary kiln may be employed, the kiln preferably being of the type which may be heated at least when reactivation is started in order that the material may be brought up to the reactivating temperature. The kiln may contain internal projections which, due to the rotary motion of the kiln, lift the catalyst powder and cause it to drop. In dropping, the catalyst powder is subjected to contact with an oxygen-containing reactivating gas preheated to the desired reactivating temperature whereupon combustion of the carbonaceous materials is effected. Instead of merely adding the catalyst to be reactivated at the inlet of the kiln, a mixture of catalyst containing the carbonaceous material and a cooled reactivated catalyst is added. When employing this method of reactivation, larger quantities of oxygen may be supplied with a lesser quantity of combustion gases without encountering the unreasonably high temperatures otherwise encountered where no provisions are made for cooling other than the increased volume of combustion gases recycled to the reactivation zone.

I claim as my invention:

1. The method of regenerating spent catalyst fouled with carbonaceous contaminants in a system wherein the spent catalyst moves continuously through a regeneration zone which comprises, admixing cool regenerated catalyst with the spent catalyst and treating the mixture with a gas containing free oxygen under conditions such as to cause the combustion of the carbonaceous contaminants.

2. A method of regenerating spent catalyst fouled with carbonaceous material which comprises admixing cool regenerated catalyst with the spent catalyst, passing the mixture in continuous flow through a regenerating zone, and treating the mixture in said zone with a gas containing free oxygen under conditions such as to burn carbonaceous material from the spent catalyst.

3. A method of regenerating spent catalyst fouled with carbonaceous material which comprises passing the spent catalyst in continuous movement through a regenerating zone and therein treating the same with a gas containing free oxygen under conditions such as to burn carbonaceous material from the catalyst, withdrawing regenerated catalyst from said zone and commingling a cooled portion thereof with the spent catalyst undergoing regeneration.

4. A method of regenerating spent catalyst fouled with carbonaceous material which comprises passing the spent catalyst in continuous movement through a regenerating zone and therein treating the same with a gas containing free oxygen under conditions such as to burn carbonaceous material from the catalyst, withdrawing regenerated catalyst from said zone and cooling a portion thereof, and recycling the cooled portion of the regenerated catalyst to the regenerating zone.

5. The method of regenerating spent silica-alumina catalyst containing carbonaceous material in a system wherein the spent catalyst moves continuously through a regenerating zone, which comprises admixing cool regenerated silica-alumina catalyst with the spent catalyst and treating the mixture with a gas containing free oxygen under conditions such as to burn carbonaceous material from the spent catalyst.

6. The method of claim 3 further characterized in that the catalyst comprises silica and alumina.

7. The method of claim 4 further characterized in that the catalyst comprises silica and alumina.

LOUIS S. KASSEL.

REFERENCES CITED

The following references are of record in the file of this patent:

UNITED STATES PATENTS

| Number | Name | Date |
|---|---|---|
| 1,799,858 | Miller | Apr. 7, 1931 |

FOREIGN PATENTS

| Number | Country | Date |
|---|---|---|
| 533,037 | Germany | Sept. 8, 1931 |
| 127,245 | Switzerland | Apr. 29, 1927 |